US005174006A

United States Patent [19]

Ellis

[11] Patent Number: 5,174,006

[45] Date of Patent: Dec. 29, 1992

[54] ADJUSTABLE SEAL INSTALLATION TOOL

[76] Inventor: Mark A. Ellis, 530 E. Oakmont, Orange, Calif. 92667

[21] Appl. No.: 785,310

[22] Filed: Oct. 30, 1991

[51] Int. Cl.[5] .............................................. B23P 19/04

[52] U.S. Cl. ...................................................... 29/275

[58] Field of Search ................. 29/275, 254, 255, 280, 29/278, 270, 235

[56] References Cited

U.S. PATENT DOCUMENTS

| | | | |
|---|---|---|---|
| 2,775,025 | 12/1956 | Williams | 29/275 |
| 3,092,902 | 6/1963 | Fowler | 29/275 |
| 3,165,949 | 1/1965 | Thill | 29/275 |
| 3,513,525 | 5/1970 | Flachbarth et al. | 29/275 |
| 3,651,553 | 3/1972 | Dodd | 29/275 |
| 3,942,234 | 3/1976 | Kepler | 29/275 |
| 3,956,801 | 5/1976 | Wood | 29/275 |
| 4,455,731 | 6/1984 | Morgan | 29/280 |

*Primary Examiner*—Robert C. Watson
*Attorney, Agent, or Firm*—Hawes & Fischer

[57] ABSTRACT

An adjustable tool to reliably retain and accurately align annular seals of varying diameter for installation in a hub, housing, or similar component, at an axle or shaft of a motor vehicle. The tool includes a drive dish upon which a seal is received and to which an impact force is applying by way of an elongated handle, so as to cause the seal to be installed. The tool also includes a seal retaining assembly to be moved radially over the drive dish and into engagement with the seal so that said seal is centered and retained on the tool to facilitate installation.

18 Claims, 7 Drawing Sheets

ADJUSTABLE SEAL INSTALLATION TOOL

BACKGROUND OF THE INVENTION

1. Field of the Invention

This invention relates to adjustable tools that are adapted to reliably retain and accurately align annular seals of varying diameter for installation in a hub, housing, or similar component, at an axle or shaft of a motor vehicle. The disclosed installation tools replace the need for a plurality of different tools to accommodate seals of different size (i.e. diameter) as has heretofor been the practice in industries where there is a need to periodically install such seals.

2. Background Art

As will be known to those skilled in the art, seals are required to retain a lubricant inside the hub or housing at the axle or shaft of a motor vehicle so as to prevent the lubricant from leaking out of the bearing cavity while keeping contaminants out of said cavity. However, the seals need to be replaced from time to time due to wear, fatigue, exposure to high and low temperatures, and the like.

The seals are typically annular in configuration and include a flanged outer ring made of steel and a rubber or leather lip extending therefrom. The seal fits into the hub or housing such that the lip thereof blocks the leakage of the lubricant from the bearing cavity. The seals are manufactured so as to have different diameters to be used for different applications. In view of the foregoing, it has been common to have on hand a different installation tool to accommodate each different seal. Consequently, manufacturing and maintenance costs as well as storage space consumption are undesirably increased. Moreover, a mechanic is often faced with the time-consuming task of making cross-references and other checks to ascertain the correct tool for use with a particular seal. If the correct installation can not be easily identified or located, mechanics are known to use any convenient substitute, which may result in either damage to the seal or a misalignment of the seal relative to the shaft or axle. What is more, the conventional installation tools are typically heavy and cumbersome to use.

It would therefore be desirable to have available a single, relatively low cost and easy to use installation tool which is adjustable to receive and retain seals of varying diameter, whereby to avoid the necessity of having a plurality of different tools to accommodate a corresponding plurality of different seals. In addition, it would be further desirable that the tool be adapted to accurately align the outside diameter of the seal for a reliable installation.

BRIEF SUMMARY OF THE INVENTION

In general terms, an easy to use, adjustable seal installation tool is disclosed by which to drive seals of varying diameter into the hub or housing at an axle or shaft of a motor vehicle. According to a first embodiment of the invention, the installation tool includes a drive dish upon which a seal is received and to which an impact driving force is applied, and a seal retaining assembly which is adjustable to retain the seal at the drive dish, regardless of the inside diameter of said seal. The seal retaining assembly has a plurality of seal locator rims which may be displaced in radially inward and outward directions. A seal is seated upon the drive dish when the seal locator rims are moved to their radially inner-most position. The seal locator rims are then moved in a radially outward direction and into engagement with the inside of the seal so that the seal is centered and retained on the tool. The seal installation tool of the first embodiment also includes a bearing alignment cone comprising a plurality of evenly spaced spring-like fingers. The resilient nature and conical configuration of the bearing alignment cone automatically and accurately aligns the tool so that the seal may be reliably installed when a sharp impact force is applied to an elongated handle connected to the drive dish.

An adjustable seal installation tool formed in accordance with a second embodiment of the present invention includes a drive dish upon which a seal is received and to which an impact force is applied, and a seal retaining assembly to retain the seal at the drive dish. The seal retaining assembly includes a leaf spring comprising a spring clip having a pair of oppositely disposed resilient spring arms that are adapted to be pivoted and stressed in a radially inward direction. A seal is seated upon the drive dish when one or both of the spring arms are pivoted in the radially inward direction. The spring arms are then released to return to their relaxed, at rest position at which to engage the inside of the seal so that the seal is centered and retained on the tool. The seal installation tool of the second embodiment also includes a bearing alignment cone which is normally biased by a compression spring to its outer-most position relative to the drive dish. When the tool is pushed inwardly of the axle bearing assembly, the bearing alignment cone is moved rearwardly against the bias of the spring in a direction towards the drive dish. The spring bias and conical configuration of the bearing alignment cone automatically and accurately aligns the tool, so that the seal carried thereby can be reliably installed when a sharp impact force is applied to an elongated handle connected to the drive dish.

DETAILED DESCRIPTION OF THE INVENTION

Figure 1:
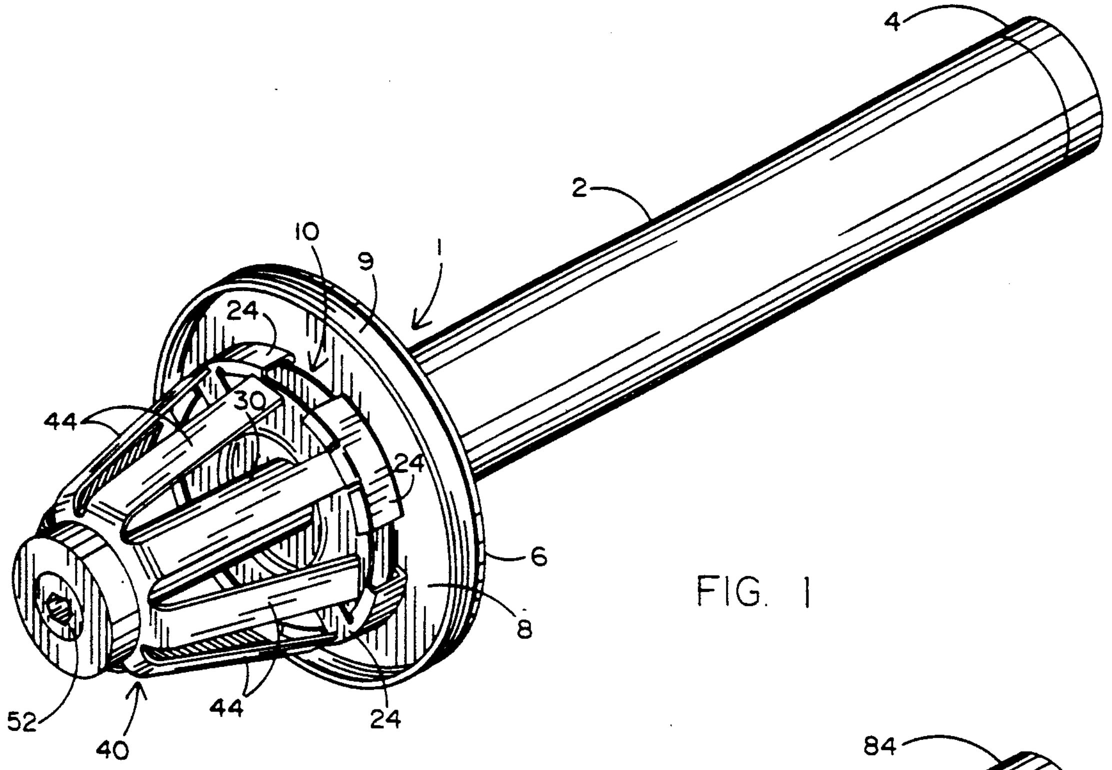
FIG. 1 is a perspective view of a seal installation tool that is formed in accordance with a first embodiment of the present invention.
Figure 3:
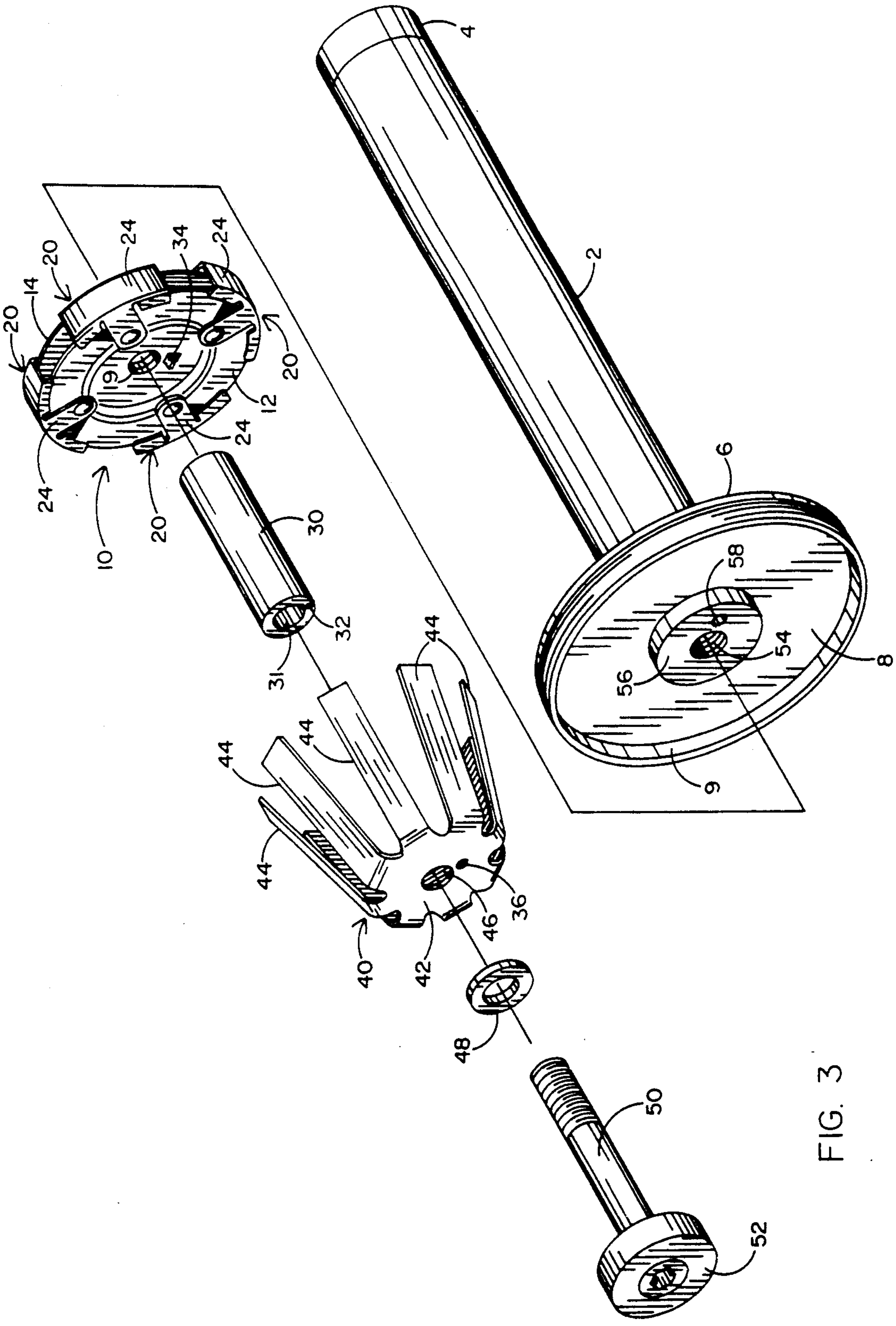
FIG. 3 is an exploded view of the installation tool of FIG. 1.
Figure 10:
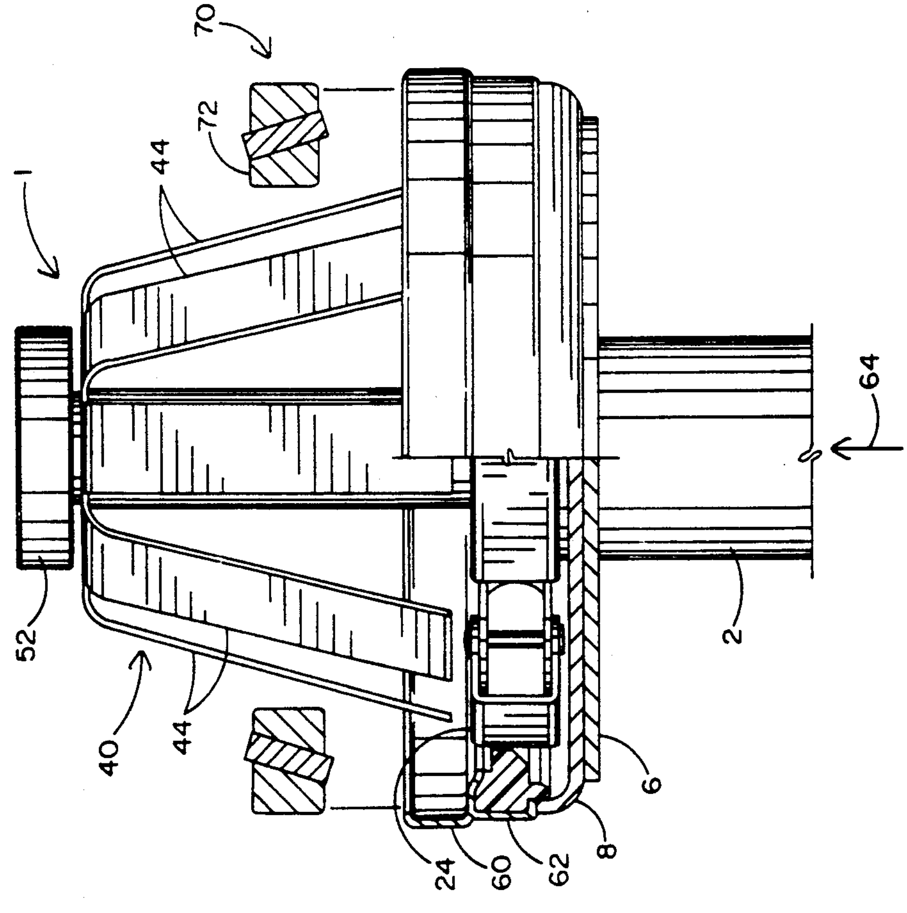
FIG. 10 is a partial cross-section showing the installation tool of FIG. 1 having a seal seated thereon and being moved through an inner axle bearing assembly.

An easy to use, adjustable seal installation tool 1 which forms a first embodiment of the present invention is initially described while referring to FIGS. 1 and 3 of the drawings. Installation tool 1 includes a drive handle 2 which is preferably manufactured from hollow steel tubing to maximize strength, minimize material consumption and reduce weight. An impact cap 4 is affixed to one end of drive handle 2. Cap 4 is preferably manufactured from cold rolled steel and is adapted to receive an impact force thereagainst, which force is transferred via handle 2 to an a seal (designated 60 in FIG. 10) during installation of the seal. Located at the opposite end of drive handle 2 is a back-up plate 6. Back-up plate 6 is generally flat with a slight dome shape and is disposed at drive handle 2 to resist an opposing force that will be generated in response to the impact force applied to impact cap 4 when installing the seal 60. A relatively flat drive dish 8 having an upturned peripheral rim 9 is affixed to back-up plate 6. Drive dish 8 is sized to receive the seal 60 thereon and to install said seal when an impact force is applied to the impact cap 4 of drive handle 2.

Figure 5:
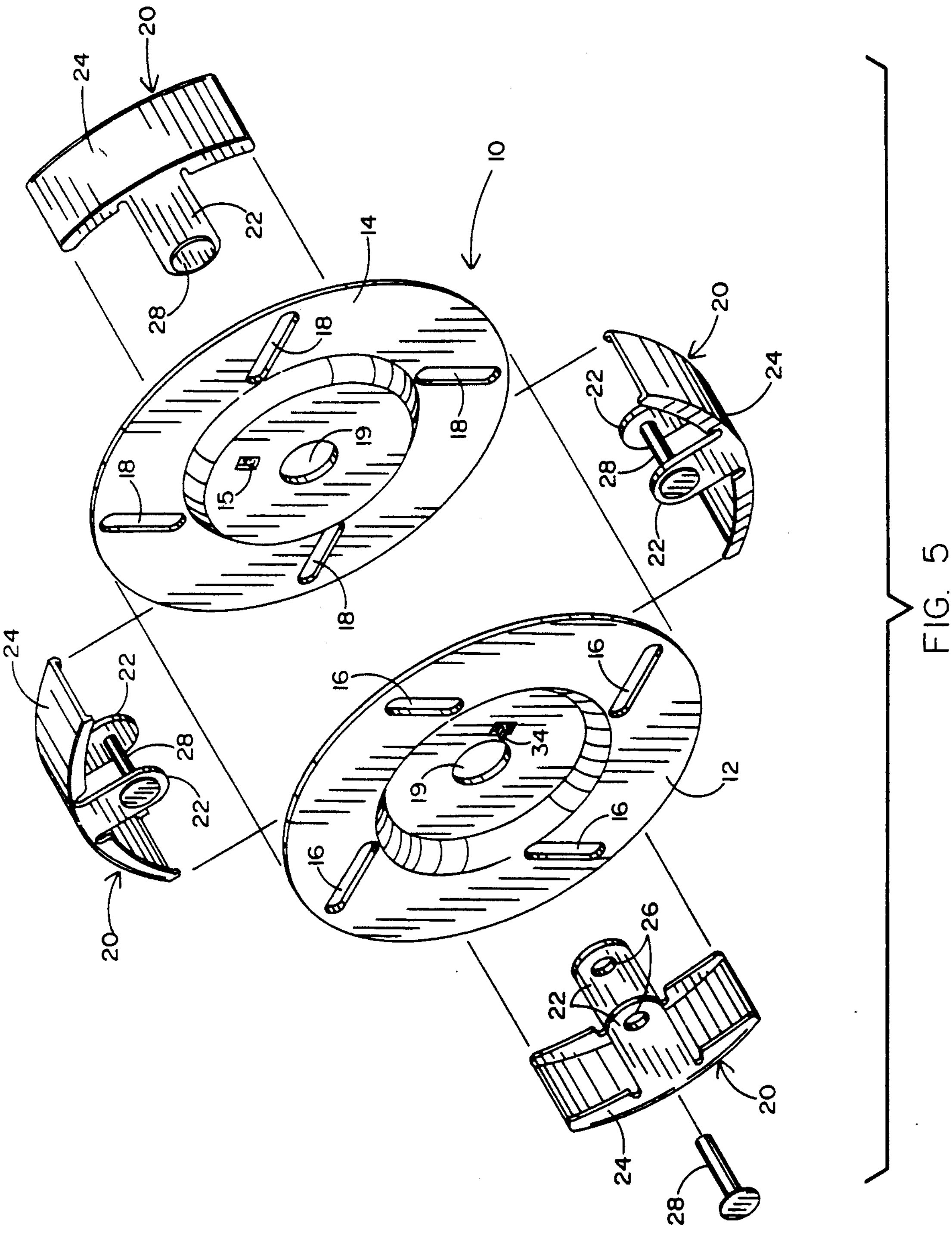
FIG. 5 is an exploded view of a seal retaining assembly which forms the installation tool of FIG. 1.

An adjustable seal retaining assembly 10 is attached to drive dish 4. Details of the seal retaining assembly 10 will be described while referring now to FIG. 5 of the drawings. The seal retaining assembly 10 comprises identically sized top and bottom actuator plates 12 and 14, each having a circular configuration and a central dome. With installation tool 1 in the assembled configuration of FIG. 1, the bottom actuating plate 14 is fixedly attached to drive dish 8. That is, at least one tab or ear 15 is lanced downwardly from the central dome of bottom actuating plate 14 for receipt in a suitably sized alignment hole 58 formed in a hub 56 which extends upwardly from the drive dish 8 (best shown in FIG. 3). The receipt of tab 15 in the hole 58 prevents the rotation of bottom plate 14 relative to the drive dish 8. The top actuating plate 12 is located above bottom plate 14, such that the respective domes thereof abut and oppose one another. However, the top actuating plate 12 is rotatable relative to the bottom actuating plate 14.

Each of the top and bottom actuating plates 12 and 14 has a plurality of slots 16 and 18 formed therein and spaced evenly thereabout. The respective pluralities of slot 16 and 18 are aligned to overlap and cross one another. Regardless of the shape of slots 16 and 18, it is important that the direction of the slots 16 of top plate 12 be opposite the direction of the overlapping slots 18 of bottom plate 14. That is, if a particular slot 16 in top plate 12 slopes upwardly, then the underlying slot 18 in bottom plate 14 slopes downwardly. Each of the top and bottom actuator plates 12 and 14 also has a centrally disposed hole 19 formed therein to receive a bolt (designated 50 in FIG. 3).

Seal locators 20 are interconnected with the top and bottom actuating plates 12 and 14 at each of the pairs of overlapping slots 16 and 18 formed therein. Inasmuch as seal retaining assembly 10 is illustrated with four pairs of overlapping slots 16 and 18 in plates 12 and 14, four seal locators 20 are respectively interconnected therewith at slots 16 and 18. However, it is to be understood that the numbers of pairs of overlapping slots 16 and 18 and the seal locators 20 associated therewith are not to be considered as limitations of the present invention. Each seal locator 20 includes a pair of arms 22 that are spaced from and aligned parallel with one another. The first ends of the arms 22 are coextensively connected to an arcuately shaped seal retaining rim 24. The opposite ends of arms 22 include a hole 26 formed therein through which to receive a stainless steel rivet 28. With the seal retaining assembly 10 in its assembled configuration, as shown in FIGS. 1 and 3, a rivet 28 extends through a corresponding pair of slots 16 and 18 in actuating plates 12 and 14 for receipt in the respective holes 26 in the arms 22 of a seal locator 20, whereby to couple the seal locator 20 to said actuating plates. As will soon be described, the rivets 28 of seal locators 20 are sized to ride through the overlapping slots 16 and 18 in top and bottom actuator plates 12 and 14 so as to correspondingly adjust the radial position of the seal retaining rims 24 relative to the peripheral rim 9 of drive dish 8. In this manner, and as an important advantage of the present invention, the seal supporting assembly 10 of seal installation tool 1 can be easily adjusted to accommodate seals of different inside diameters.

Referring once again to FIGS. 1 and 3 of the drawings, a cylindrical drive riser 30 (best shown in FIG. 3) having a hollow interior 31 extends between seal retaining assembly 20 and a bearing alignment cone 40. More particularly, the drive riser 30 has at least one alignment hole (e.g. 32) formed in each of the opposite ends thereof. A first alignment hole (not shown) at one end of drive riser 30 is sized to receive a tab 34 that is lanced upwardly from the top actuating plate 12 of seal retaining assembly 10. In this manner, drive riser 30 is coupled to the top actuating plate 12, whereby a rotation imparted to riser 30 is transferred to top plate 12 to cause said top plate to rotate relative to the bottom actuating plate 14. Another alignment hole 32 at the opposite end of drive riser 30 is sized to receive a tab 36 that is lanced downwardly from bearing alignment cone 40. Thus, a rotation of bearing alignment cone 40 will be transferred to drive riser 30 to cause said drive riser and alignment cone to rotate in unison.

The bearing alignment cone 40 has a flat base 42 and a plurality of resilient, spring-like fingers 44 coextensively connected to and projecting downwardly from said base 42. Fingers 44 are uniformly spaced around and slope radially outward from the base 42 at a relatively gentle angle (e.g. approximately 20 degrees) to provide alignment cone 40 with a tapered configuration, the advantage of which will soon be described. An opening 46 is formed through the base 42 of bearing alignment cone 40. In the assembled tool configuration of FIG. 1, each of the seal retaining assembly 10, the drive riser 30 and the bearing alignment cone 40 are coaxially arranged relative to one another such that the holes 19 in top and bottom actuating plates 12 and 14, the hollow interior 31 of the cylindrical drive riser 30, and the opening 46 in the base 42 of alignment cone 40 are axially aligned to receive therethrough a threaded bolt 50. One end of bolt 50 has a lock knob 52 affixed thereto. The opposite end of bolt 50 is threaded and sized to fit successively through opening 46, interior 31 and holes 19, whereupon to be mated to a correspondingly threaded hole 54 formed in the aforementioned hub 56 which extends upwardly from drive dish 8. A washer 48 surrounds bolt 50 and lies between the lock knob 52 and the base 42 of bearing alignment cone 40.

The hub 56 is a generally cylindrical plug having the threaded hole 54 formed therein to receive the threaded end of bolt 50. By tightening the lock knob 52 downwardly against the base 42 of bearing alignment cone 40, the aforementioned interconnection and coaxial arrangement of drive riser 30 between bearing alignment cone 40 and seal retaining assembly 10 can be maintained. The hub 56 is press fit through correspondingly sized holes (not shown) formed in the back-up plate 6 and drive dish 8 so as to extend approximately $1\frac{1}{2}$ inches into the hollow body of drive handle 2. As earlier indicated, hub 56 has an alignment hole 58 formed therein and sized to receive a tab 15 (best shown in FIG. 5) which is lanced downwardly and outwardly from the bottom actuating plate 14 to prevent said bottom plate 14 from rotating. It is also within the scope of this invention to form additional alignment holes in hub 56 similar to that designated 58 to receive respective tabs (not shown) from the bottom actuating plate 14 so as to more reliably prevent the rotation of said plate 14.

The operation of the adjustable seal installation tool 1 is now described for installing a conventional seal 60 in the hub or housing at an axle or shaft of a motor vehicle. Prior to using tool 1, the worn seal is removed and discarded. The inner axle bearing is also typically removed for inspection and either cleaned and then reinstalled or replaced by a new axle bearing. A new seal 60 is then mounted on the installation tool 1. However, the tool 1 must first be adapted to receive and retain seal 60. More particularly, the lock knob 52 is loosened slightly to permit the bearing alignment cone 40 of FIG. 3 to be grasped and rotated in a counter-clockwise direction around the bolt 50 which passes therethrough. Inasmuch as the alignment cone 40 is coupled to drive riser 30 (by means of the lanced tab 36 of cone 40 being received within the alignment hole 32 of riser 30), the rotation imparted to cone 40 is transferred to drive riser 30 whereby to cause said riser to also rotate. Since the drive riser 30 is coupled to the top actuating plate 12 of seal retaining assembly 10 (by means of the lanced tab 34 of top plate 12 being received within the alignment hole of riser 30), the rotation imparted to drive riser 30 from alignment cone 40 is now imparted to the top actuating plate 12, whereby to cause said top plate 12 to rotate in a counter-clockwise direction relative to the bottom actuating plate 14 which is affixed to drive dish 8.

Figure 8:
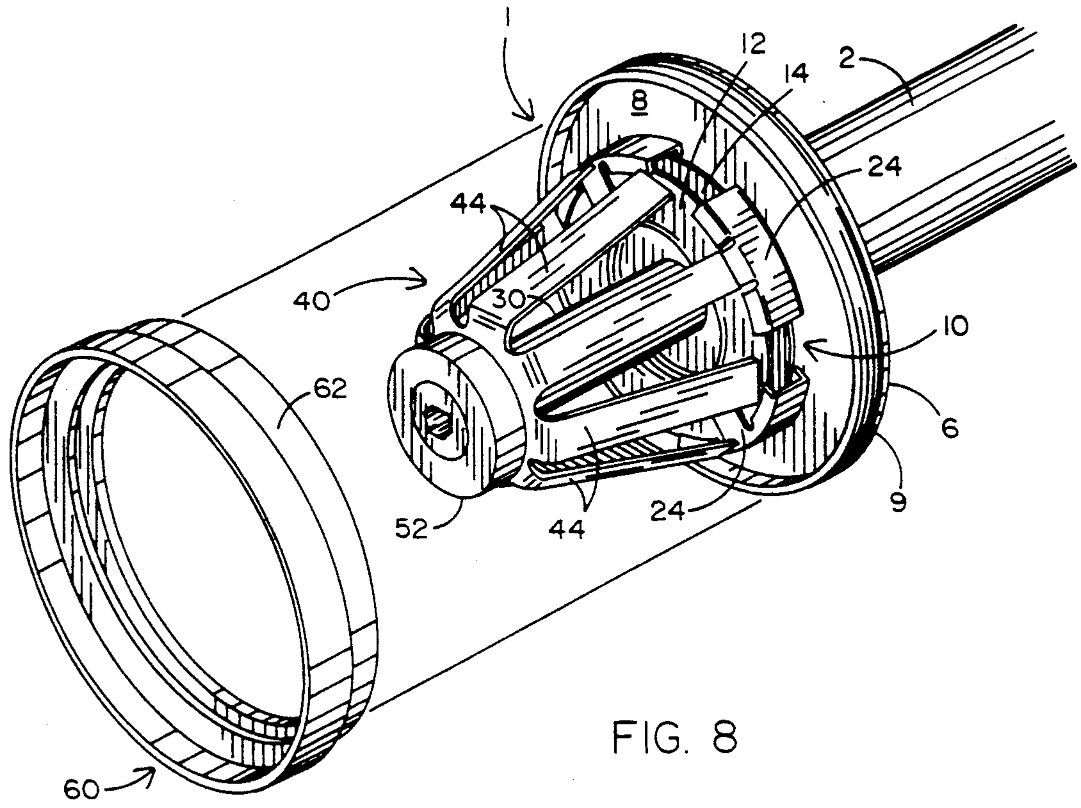
FIG. 8 shows a conventional seal ready for mounting upon the installation tool of FIG. 1.

As the top actuating plate 12 of seal retaining assembly 10 rotates, the rivets 28 which extend between the top and bottom actuating plates 12 and 14 are driven inwardly through the slots 16 formed therein. Inasmuch as the bottom actuating plate 14 is stationary and the slots 16 and 18 in opposing plates 12 and 14 overlap one another in opposite directions, a cam action is produced, whereby the rivets 28 are pulled by the rotating top actuating plate 12 inwardly through the slots 18 in bottom actuating plate 14. The inward movement of rivets 28 is transferred to the respective seal centering rims 24 of seal locators 20 via the arms 22 thereof, whereby said rims are correspondingly pulled to their radial innermost position relative to the rim 9 of drive dish 8 (shown at FIG. 8). Accordingly the seal centering rims 24 are located adjacent the outer edges of the top and bottom actuating plates 12 and 14 of seal retaining assembly 10 to establish a gap between rims 24 and the rim 9 of drive dish 8 (also shown in FIG. 8).

Figure 7:
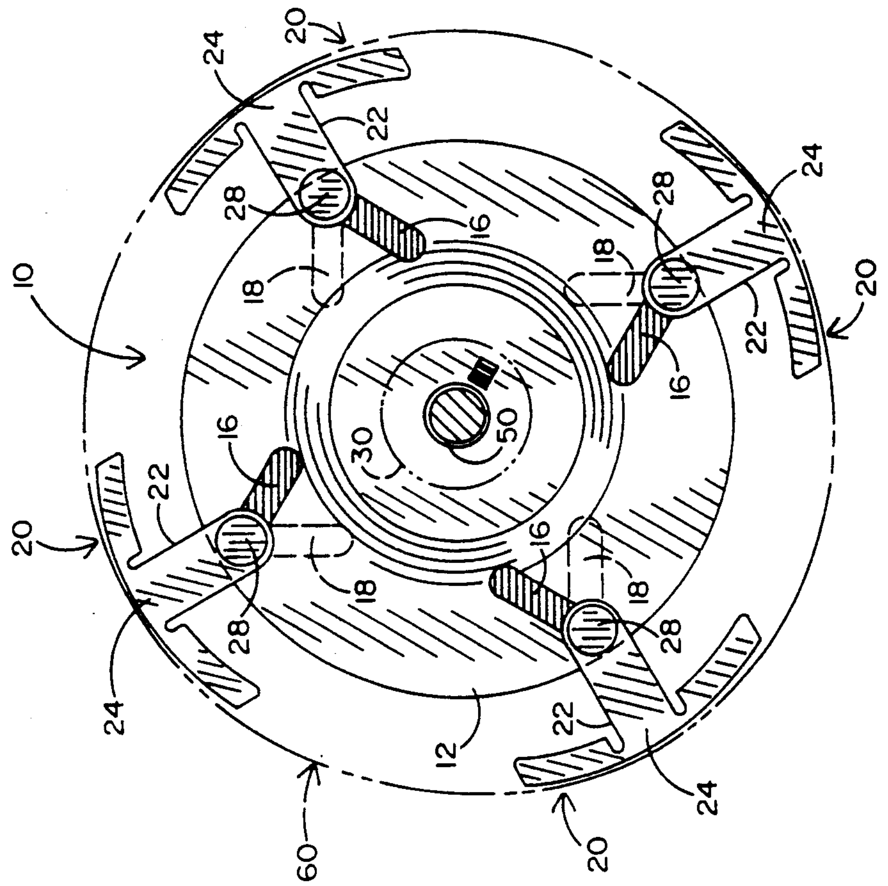
FIGS. 6 and 7 illustrate the adjustable nature of the seal retaining assembly of FIG. 5 to retain seals of different inside diameter.
Figure 6:
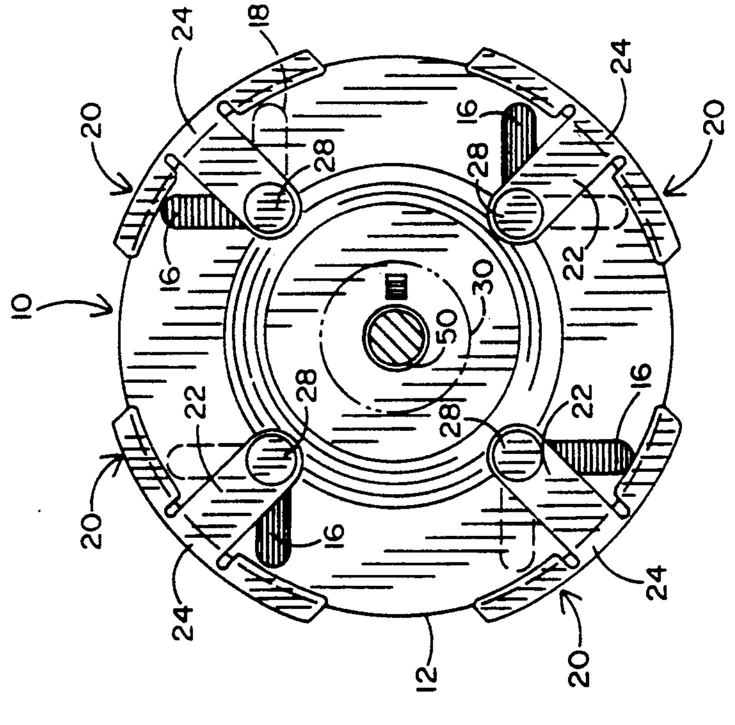

The seal 60 is now mounted on the seal installation tool 1, such that the lip 62 of the seal is received in the aforementioned gap between the seal centering rims 24 of seal locators 20 and the rim 9 of drive dish 8. With the seal resting upon the drive dish 8, the bearing alignment cone 40 (of FIG. 3) is again grasped and rotated in a clockwise direction. The rotation imparted to cone 40 is transferred to the top actuating plate 12 of seal retaining assembly 10, via drive riser 30, whereby to cause said top plate 12 to rotate in a clockwise direction relative to the stationary bottom actuating plate 14. As the top actuating plate 12 rotates, the rivets 28 are driven by said plate outwardly through the slots 16 formed therein while, at the same time, pushing the rivets 28 outwardly through the slots 18 formed in the bottom actuating plate 14. The outward movement of rivets 28 is transferred to the respective seal centering rims 24 of seal locator 20 via the arms 22 thereof, whereby said rims 24 are correspondingly repelled or pushed radially outward from seal retaining assembly 10 (best shown in FIG. 7). The bearing alignment cone 40 is rotated until the seal centering rims 24 are moved into tight frictional engagement with the inside diameter of the seal 60, whereby to center said seal (relative to the alignment cone 40) and prevent the seal from inadvertently falling off the installation tool 1 (best shown in FIG. 10).

By virtue of the foregoing, the seal centering rims 24 of seal locators 20 hold the seal 60 in coaxially alignment with the bearing alignment cone 40 to prevent wobble and facilitate an easy and accurate installation of the seal. Moreover, seals of varying diameter can now be installed by means of a single installation tool 1 since the position of the seal retaining assembly 10 can be adjusted to receive and retain seals of different inside diameters. That is, the seal centering rims 24 can be moved radially outward to any suitable location over drive dish 8 and towards the rim 9 thereof until frictional engagement is made with the inside of the particular seal to be retained and installed.

With the seal 60 firmly retained on the drive dish 8 of installation tool 1, the lock knob 52 is tightened down to preserve the alignment and retention of said seal. The installation tool 1 is now ready to install the seal according to the manufacturer's instructions, such that the bearing alignment cone 40 is pushed inwardly of the inner race 72 of the inner axle bearing 70 (best shown in FIG. 10). Because of the resilient, spring-like nature of the fingers 44 of bearing alignment cone 40, the outside of seal 60 will be coaxially aligned with the hub or housing (not shown). That is to say, the spring fingers 44 are adapted to bend slightly to adjust the diameter of bearing alignment cone 40 to the inside diameter of the inner race 72 of axle bearing 70 to automatically center the tool and thereby position seal 60 in coaxial alignment with the hub or housing. An axial impact force is then applied to the impact cap of drive handle 2 (by means of a sledge, or the like) in the direction of reference arrow 64 until the seal 60 is fully inserted in the hub or housing. With the seal in place, the installation tool 1 is pulled outwardly from the inner axle bearing 70. However, because of the conical shape of bearing alignment cone 40, the seal 60 will not be removed with the tool 1 but will permit the fingers 44 to slide outwardly past bearing 70. Accordingly, a single installation tool 1 may now be used to reliably retain and install seal 60 (regardless of size), while accurately and automatically aligning the outside of the seal with the inner axle bearing 70 to assure proper seal installation.

Figure 2:
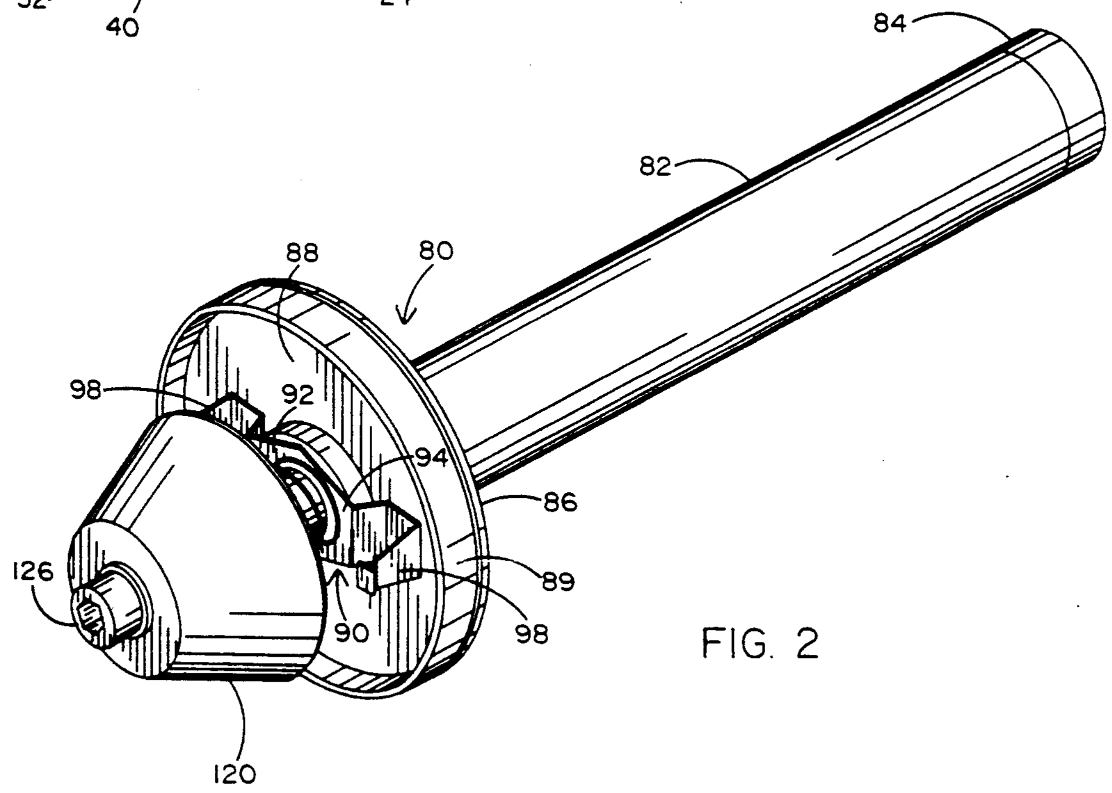
FIG. 2 is a perspective view of a seal installation tool that is formed in accordance with a second embodiment of the present invention.
Figure 4:
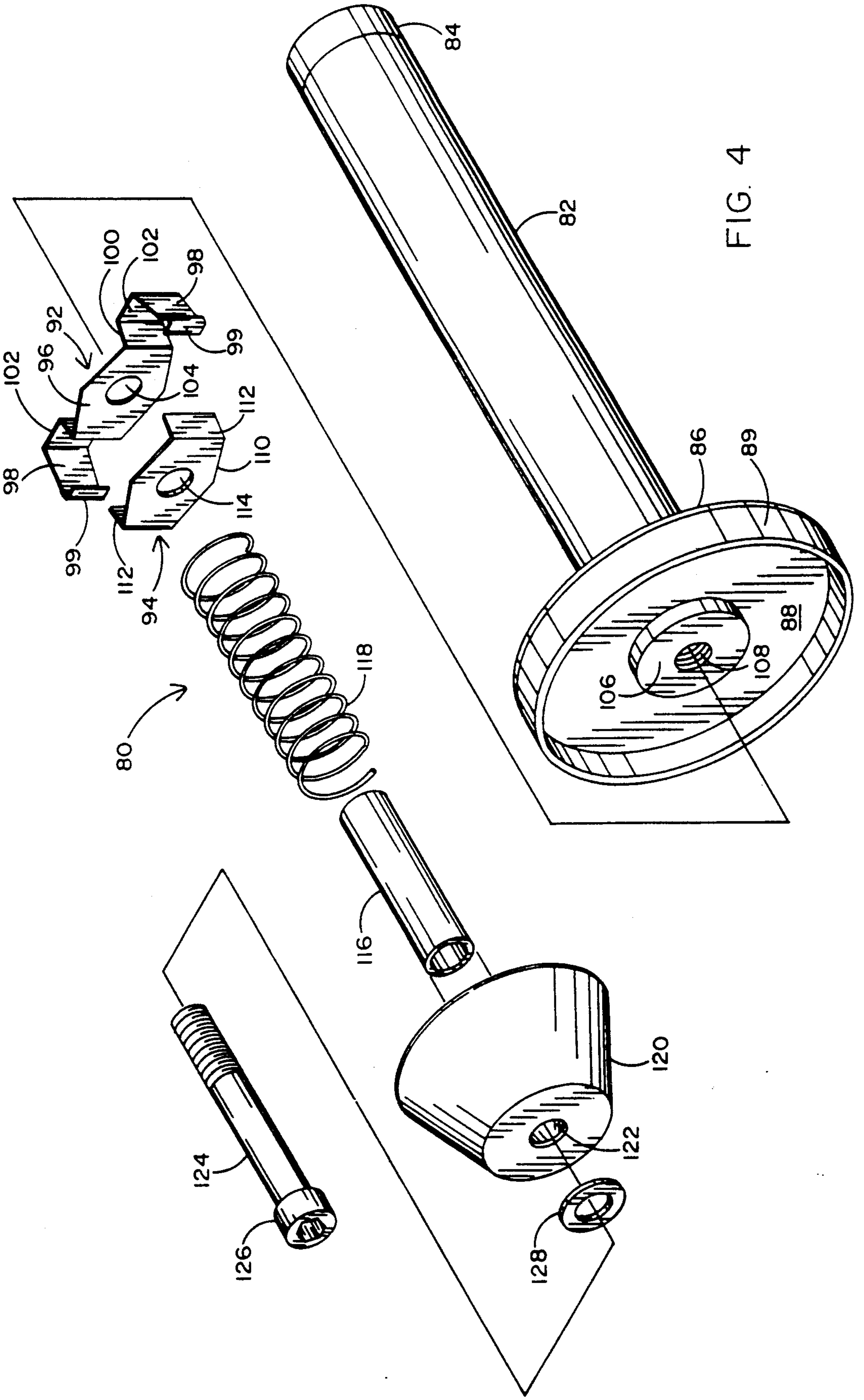
FIG. 4 is an exploded view of the installation tool of FIG. 2.

An adjustable seal installation tool 80 which forms a second embodiment of the present invention is now described while initially referring to FIGS. 2 and 4 of the drawings. Like the tool previously disclosed, installation tool 80 includes a hollow, steel drive handle 82. An impact cap 84 is affixed to one end of drive handle 82. The opposite end of drive handle 2 is connected to a relatively flat drive dish 88. A back-up plate 86 is affixed to drive dish 88 and connected to drive handle 2. Drive dish 88 has an upwardly projecting peripheral rim 89 and is sized to receive a seal 160 (of FIG. 9) thereon so that said seal can be installed in the hub or housing at an axle or shaft of a motor vehicle when an impact force is applied to the drive cap 84 of drive handle 82.

An adjustable seal retaining assembly 90 is attached to drive dish 88. As is best shown in FIG. 4, the seal retaining assembly includes a leaf spring 92 and a spring clip 94. Leaf spring 92 is preferably formed from spring steel and includes a flat base 96 and a pair of resilient spring arms 98 which are disposed at opposite sides of the base 96. A finger 99 projects radially from the top end of each spring arm 98. The bottom end of each spring arm 98 is coextensively connected to the base 96 by way of a shoulder 100, which turns downwardly from base 96, and a spring support 102, which lies below base 96. A central opening 104 is formed through the base 96.

In the assembled tool configuration of FIG. 2, the leaf spring 92 is attached to the drive dish 88 at a hub 106, such that spring arms 98 are spaced inwardly from the rim 89 of drive dish 88 to establish a gap therebetween. More particularly, the hub 106 is a generally cylindrical plug that is press fit through correspondingly sized holes (not shown) in the drive dish 88 and back-up plate 86 so as to extend slightly into the hollow body of drive handle 82. A threaded hole 108 is formed through hub 106. The base 96 of leaf spring 92 is positioned across the face of hub 106 such that the opening 104 and the hole 108 are axially aligned with one another to receive an assembly bolt 124 therethrough. Spring supports 102 rest atop the drive dish 88 such that hinges are established at the intersection of spring supports 102 with spring arms 98 around which said spring arms pivot (in a manner to be described in greater detail when referring to FIG. 9).

The spring clip 94 includes a flat base 110 and a downwardly turned wing 112 disposed at opposite ends of base 110. A central opening 114 extends through base 110. In the assembled tool configuration, the base 110 of spring clip 94 is received flush against the base 96 of leaf spring 92, and the downturned wings 112 are received flush against the downturned shoulders 100. Central openings 114 and 104 are axially aligned with one another to receive the assembly bolt 124 therethrough. Thus, leaf spring 92 and spring clip 94 are secured one atop the other to enhance the soon to be described spring action of spring arms 98 for receiving and retaining a seal 160.

A hollow cone support shaft 116 rests against the base 110 of spring clip 94. The hollow interior of shaft 116 is axially aligned with the central openings 104 and 114 of leaf spring 92 and spring clip 94 to receive the assembly bolt 124 therethrough. Cone support shaft 116 is completely surrounded by a helical compression spring 118. One end of the compression spring rests atop spring clip 94. The opposite end of spring 118 is received within and supports a bearing alignment cone 120. The bearing alignment cone 120 tapers in a radially outward direction from top to bottom at a gentle angle (e.g. approximately 20 degrees), the advantage of which will soon be described. An opening 122 is formed in alignment cone 120, and the assembly bolt 124 is inserted through opening 122, the interior of cone support shaft 116, and the openings 104 and 114 in leaf spring 92 and spring clip 94. One end of assembly bolt 124 is threaded to be received in and mated to the threaded hole 108 in the hub 106 at drive dish 88. The opposite end of bolt 124 has a socket head 126 to permit said bolt to be rotated into engagement by the threaded hole 108. A conventional retaining washer 128 is located between the socket head 126 and the top of bearing alignment cone 120. In the assembled tool configuration of FIG. 2, the assembly bolt 124 retains the bearing alignment cone 120 in coaxially alignment with the leaf spring 92 and the spring arms 98 thereof to assure that the insertion tool 80 and the seal carried thereby will be suitably aligned with the hub at which said seal is to be installed. To this end, in the at rest tool configuration of FIG. 2, the spring 118 biases bearing alignment cone 120 to its outermost position along bolt 124 against the socket head 126.

Figure 9:
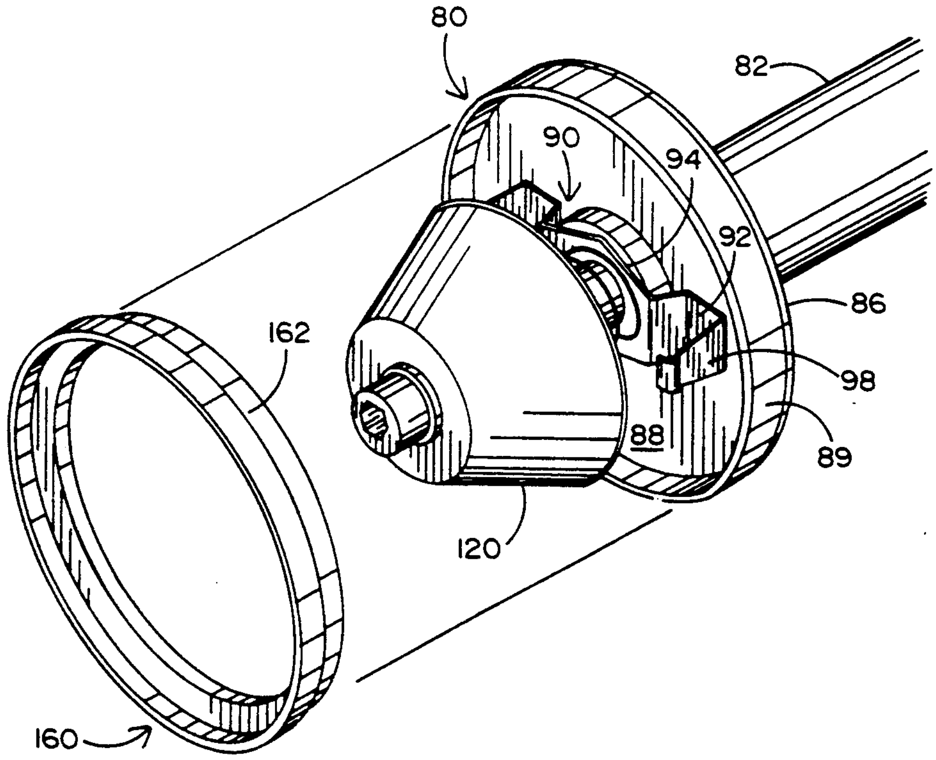
FIG. 9 shows a conventional seal ready for mounting upon the installation tool of FIG. 2.

The operation of the seal installation tool 80 is now described while referring to FIGS. 4 and 9 and the drawings. After the worn seal has been removed and the inner axle bearing repaired or replaced, a conventional seal 160 is mounted upon the tool 80 so as to be engaged by the seal retaining assembly 90. This is accomplished by mounting the seal 160 in the gap between the spring arms 98 of leaf spring 92 and the rim 89 of drive dish 88, such that the lip 162 of seal 160 extends around and is supported against the inside of said rim 89 (best shown in FIG. 11). More particularly, the user pivots and thereby stresses at least one of the resilient spring arms 98 of leaf spring 92 in a radially inward direction over drive dish 88 to permit seal 160 to fit around the seal retaining assembly 90. With the seal now in place and supported against the rim 89 of drive dish 88, the bent spring arm 98 is released and returned, by normal spring action, towards its at rest and relaxed condition. Thus, the pair of spring arms 98 of leaf spring 92 are now positioned to center the seal 160 (relative to alignment cone 120) and hold the seal 160 against the rim 89 of drive dish 88, while the fingers 99 of spring arm 98 prevent the seal from inadvertently falling out of the insertion tool 80 (also best shown in FIG. 11).

Figure 11:
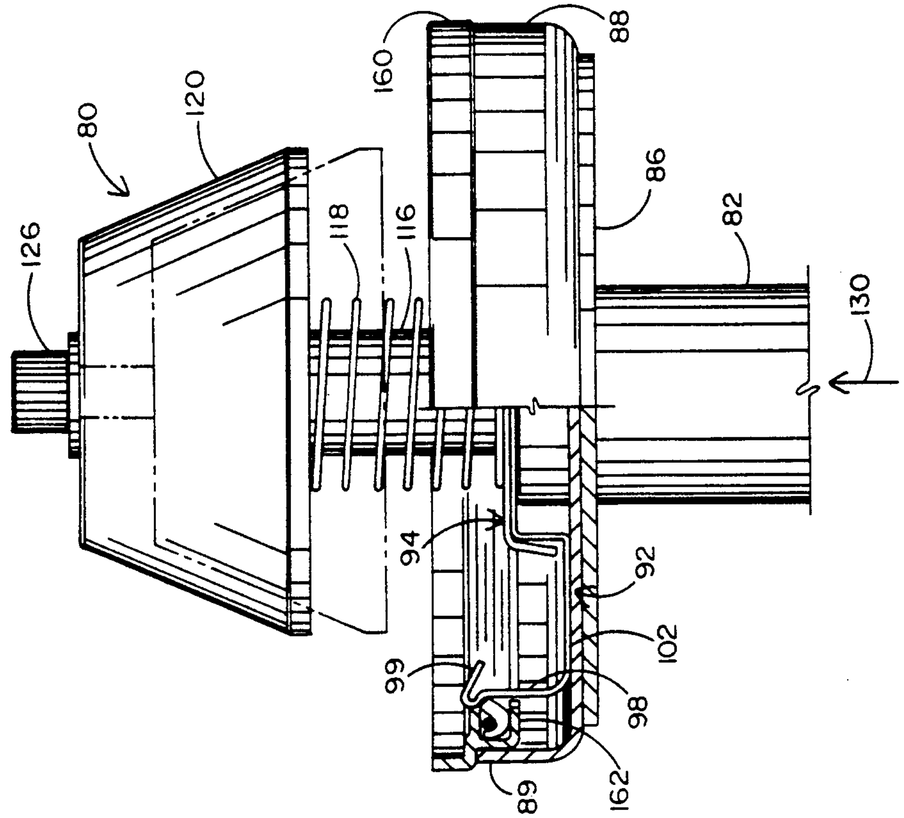
FIG. 11 is a partial cross-section showing the installation tool of FIG. 2 having a seal seated thereon and being moved through an inner axle bearing assembly.

With the seal 160 firmly retained by the spring arms 98 against the rim 89 of drive dish 88, the insertion tool 80 is now ready to install the seal according to the manufacturer's instructions. Referring now to FIG. 11 of the drawings, the bearing alignment cone 120 is pushed inwardly and into engagement with the inner race 72 of the inner axle bearing 70. Such engagement causes alignment cone 120 to move rearwardly along the assembly bolt 124 (of FIG. 4) and towards drive dish 88 against the normal bias of compression spring 118. The rearward travel of cone 120 (shown by phantom lines) is limited by the cone support shaft 116 which is surrounded by compression spring 118. The rearward movement of bearing alignment cone 120 in response to its engagement with inner axle bearing 70 acts to automatically center insertion tool 80 and thereby position the seal 160 in coaxial alignment with the hub or housing (not shown) such that said seal can be accurately installed. An axial impact force is then applied to the impact cap of the drive handle 82 (by means of a sledge) in the direction of reference arrow 130 until the seal 160 is fully installed. With the seal now in place, the installation tool 80 is then pulled outwardly of the inner axle bearing 70, and the memory of spring 118 returns alignment cone 120 to its outermost position along bolt 124. However, by virtue of the conical shape of alignment cone 120, the seal 160 will not be removed with the tool 80, but will permit cone 120 to slide outwardly past bearing 70. Accordingly, like the installation tool 1 earlier disclosed, seal installation tool 80 may also be used to reliably retain a seal 160, while accurately and automatically aligning the outside of said seal with the inner axle bearing 70 so as to assure a proper installation in the hub or housing.

It will be apparent that while the preferred embodiments of the invention have been shown and described, various modifications and changes may be made without departing from the true spirit and scope of the invention. For example, while the tools 1 and 80 have been described as being capable of installing seals 60 and 160 in a hub, housing, or similar component of a motor vehicle, it is to be understood that said tools are particularly applicable to an automobile, truck, industrial and agricultural vehicles, aircraft, and any other machine that requires such seals to prevent the leakage of lubricant from and the invasion of contaminants into the bearing cavity.

Having thus set forth the preferred embodiments, what is claimed is:

1. An installation tool to install an annular seal in a hub or housing at an axle or shaft of a motor vehicle, said installation tool comprising:

a drive dish adapted to receive the seal to be installed;

an adjustable seal retaining assembly including seal locator means movable radially over said drive dish between a radially inward position at which the seal is received by said drive dish in spaced relationship with said seal locator means and a radial outward position at which said seal is engaged by said seal locator means and retained at said drive dish;

a bearing alignment cone extending from said seal retaining assembly so as to engage the bearing assembly in the hub or housing of the motor vehicle and thereby cause said installation tool to be aligned with said hub or housing for the installation of said seal; and handle means connected to said drive dish by which to transport said installation tool to the hub or housing and to receive an impact force by which to cause the seal to be installed from said drive dish to said hub or housing.

2. The installation tool recited in claim 1, wherein said adjustable seal retaining assembly also includes an actuator plate interconnected with said seal locator means and being rotatable relative to said drive dish, the direction in which said actuator plate is rotated determining whether said seal locator means is moved towards its radial inward or radial outward position.

3. The installation tool recited in claim 2, wherein said seal locator means comprises a plurality of seal centering rims for engaging the inside of the seal, said rims interconnected with and spaced from one another about said actuator plate.

4. The installation tool recited in claim 3, wherein said actuator plate includes a plurality of slots formed therethrough and spaced from one another, said plurality of seal centering rims interconnected with said actuator plate at respective ones of said slots.

5. The installation tool recited in claim 1, wherein said adjustable seal retaining assembly also includes parallel aligned top and bottom actuator plates interconnected to said drive dish, said bottom actuator plate being fixedly connected to said drive dish and said top actuator plate being rotatable relative to said bottom actuator plate, the direction in which said top actuator plate is rotated determining whether said seal locator means is moved towards its radial inward or radial outward position.

6. The installation tool recited in claim 5, wherein said seal locator means comprises a plurality of seal centering rims for engaging the inside of the seal, said rims interconnected with and spaced from one another about said top and bottom actuator plates.

7. The installation tool recited in claim 6, wherein each of said top and bottom actuator plates includes a plurality of slots formed therethrough and spaced from one another, the slots of said top actuator plate overlapping and crossing the slots of said bottom actuator plate, said plurality of seal centering rims interconnected with said actuator plates at respective pairs of said overlapping slots.

8. The installation tool recited in claim 7, wherein said seal retaining assembly also includes a plurality of pins, each of said pins connected to a respective one of said plurality of seal centering rims and extending through a pair of overlapping slots of said top and bottom actuating plates, said pins connecting said centering rims to said plates.

9. The installation tool recited in claim 1, wherein said bearing alignment cone includes a plurality of resilient fingers spaced from one another and adapted to bend inwardly when said alignment cone engages the bearing assembly in the hub or housing.

10. The installation tool recited in claim 1, further comprising a drive shaft interconnecting said bearing alignment cone to said seal retaining assembly, said bearing alignment cone and said seal retaining assembly being rotatable in unison relative to said drive dish, such that a rotation of said alignment cone is transferred to said seal retaining assembly via said drive shaft for rotating said retaining assembly and causing a corresponding radial movement of said seal locator means over said drive dish.

11. The installation tool recited in claim 1, wherein said bearing alignment cone is coaxially aligned with said seal retaining assembly so as to engage said bearing assembly ahead of the seal to be installed.

12. An installation tool to install an annular seal in a hub or housing at an axle or shaft of a motor vehicle, said installation tool comprising:

a drive dish adapted to receive the seal to be installed;

adjustable seal retaining means including top and bottom actuator plates and seal locator means, said bottom actuator plate being fixedly connected to said drive dish and having a first plurality of slots formed therethrough and said top actuator plate being rotatable relative to said bottom actuator plate and having a second plurality of slots formed therethrough so as to overlap and cross respective slots formed through said bottom plate, said seal locator means interconnected with said bottom and top actuator plate at pairs of said overlapping slots therethrough and movable radially over said drive dish to engage or release said seal to be installed, the radial direction in which said seal locator means moves being dependent upon the direction in which said top actuator plate rotates relative to said bottom actuator plate; and handle means connected to said drive dish by which to transport said installation tool to the hub or housing and to receive an impact force by which to cause the seal to be installed from said drive dish to said hub or housing.

13. The installation tool recited in claim 12, further comprising a bearing alignment cone extending axially from said seal retaining means so as to engage the bearing assembly in the hub or housing of the motor vehicle ahead of said seal to be installed and thereby cause said installation tool to be aligned with said hub or housing for the installation of said seal.

14. The installation tool recited in claim 13, wherein said bearing alignment cone includes a plurality of resilient fingers spaced from one another and adapted to bend inwardly when said alignment cone engages the bearing assembly in the hub or housing.

15. The installation tool recited in claim 13, further comprising a drive shaft interconnected between said bearing alignment cone and the top actuator plate of said seal retaining means, said bearing alignment cone and said drive shaft being rotatable in unison, such that a rotation of said alignment cone is transferred via said drive shaft to said top actuator plate to cause said top actuator plate to rotate relative to said bottom actuator plate.

16. The installation tool recited in claim 12, wherein the seal locator means of said seal retaining means includes a plurality of arcuately shaped seal centering rims for engaging the inside of the seal received by said drive dish, said seal centering rims interconnected with said top and bottom actuator plates at respective pairs of said overlapping slots formed therethrough.

17. An installation tool to install an annular seal in a hub or housing at an axle or shaft of a motor vehicle, said installation tool comprising:

a drive dish adapted to receive the seal to be installed;

a rotatable seal retaining assembly including seal locator means movable radially over said drive dish between a radially inward position at which the seal is received by said drive dish in spaced relationship with said seal locator means and a radial outward position at which said seal is engaged by said seal locator means and retained at said drive dish, the radial direction in which said seal locator means moves being dependent upon the rotation of said seal retaining assembly;

a rotatable bearing alignment means extending axially from said seal retaining assembly to engage the bearing assembly in the hub or housing of the motor vehicle ahead of the seal to be installed and thereby cause said installation tool to be aligned with said hub or housing for the installation of said seal;

drive means interconnected between said rotatable bearing alignment means and said rotatable seal retaining assembly, said bearing alignment means and said drive means being rotatable in unison, such that a rotation of said alignment means is transferred to said seal retaining assembly via said drive means to rotate said retaining assembly and cause a corresponding radial movement of said seal locator means over said drive dish; and handle means connected to said drive dish by which to transport said installation tool to the hub or housing and to receive an impact force by which to cause the seal to be installed from said drive dish to said hub or housing.

18. The installation tool recited in claim 17, wherein said bearing alignment means is a cone coaxially aligned with said seal retaining assembly.

* * * * *